United States Patent
Chauhan et al.

(10) Patent No.: US 11,432,134 B2
(45) Date of Patent: Aug. 30, 2022

(54) SYSTEM AND METHOD OF CUSTOMIZING AND UPDATING INFORMATION

(71) Applicant: JIO PLATFORMS LIMITED, Ahmedabad (IN)

(72) Inventors: Devesh Chauhan, Navi Mumbai (IN); Viraj Dadia, Mumbai (IN); Vinita Kaushik, Navi Mumbai (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 0 days.

(21) Appl. No.: 17/024,311

(22) Filed: Sep. 17, 2020

(65) Prior Publication Data

US 2021/0084486 A1 Mar. 18, 2021

(30) Foreign Application Priority Data

Sep. 18, 2019 (IN) .............................. 201921037545

(51) Int. Cl.
| | |
|---|---|
| *H04B 1/38* | (2015.01) |
| *H04W 8/18* | (2009.01) |
| *H04W 48/18* | (2009.01) |
| *H04W 4/50* | (2018.01) |
| *H04W 8/20* | (2009.01) |

(52) U.S. Cl.
CPC ............. *H04W 8/183* (2013.01); *H04W 4/50* (2018.02); *H04W 8/205* (2013.01); *H04W 48/18* (2013.01)

(58) Field of Classification Search
None
See application file for complete search history.

(56) References Cited

U.S. PATENT DOCUMENTS

| | | | | |
|---|---|---|---|---|
| 2015/0044991 | A1* | 2/2015 | Inlow ................ | H04M 3/42178 455/406 |
| 2015/0156687 | A1* | 6/2015 | Wu ....................... | H04W 48/18 455/436 |
| 2017/0295449 | A1* | 10/2017 | Pereira ................... | H04W 4/50 |

FOREIGN PATENT DOCUMENTS

EP 0831448 A2 * 3/1998 ............. G09F 9/375

* cited by examiner

*Primary Examiner* — Jinsong Hu
*Assistant Examiner* — Alexander J Yi
(74) *Attorney, Agent, or Firm* — Klarquist Sparkman, LLP

(57) ABSTRACT

A system and method of customizing/updating an information displayed at a user equipment [402]. The method encompasses transmitting, via a SIM OTA update to a SIM card configured at a user equipment [402], a display bit condition, wherein the display bit condition comprises a condition to display at the user equipment [402] the information comprising at least one of a service provider name and a network operator name, present in at least one of a SIM information and a network information message. The method thereafter encompasses updating, via a network entity [404], the information provided in at least one of the SIM information and the network information message. Further, the method comprises transmitting, from the network entity [404] to the user equipment [402], the updated information, to display in real-time the updated information at the user equipment [402] based on the display bit condition.

15 Claims, 13 Drawing Sheets

SYSTEM AND METHOD OF CUSTOMIZING AND UPDATING INFORMATION

CROSS REFERENCE TO RELATED APPLICATIONS

This application claims priority to Indian Patent Application No. 201921037545, filed Sep. 18, 2019, the disclosure of which is hereby incorporated herein by reference in its entirety.

TECHNICAL FIELD

The present disclosure relates to the field of wireless network and more particularly to a system and method of updating an information displayed at a user equipment.

BACKGROUND OF THE DISCLOSURE

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Today a widely deployed wireless network in order to provide various communication services such as voice, video, data, advertisement, content, messaging, broadcasts, etc. usually comprises multiple access networks and support communications for multiple users by sharing the available network resources.

One example of such a network is the Evolved Universal Terrestrial Radio Access (E-UTRA) which is a radio access network standard meant to be a replacement of the Universal Mobile Telecommunications System (UMTS) and High-Speed Downlink Packet Access/High-Speed Uplink Packet Access (HSDPA/HSUPA) technologies specified in 3GPP releases 5 and beyond. Unlike HSPA, Long Term Evolution's (LTE's) E-UTRA is an entirely new air interface system, unrelated to and incompatible with W-CDMA. It provides higher data rates, lower latency and is optimized for packet data. The earlier UMTS Terrestrial Radio Access Network (UTRAN) is the radio access network (RAN), defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High-Speed Packet Access (HSPA), which provides higher data transfer speeds and capacity to associated UMTS networks. Furthermore, as the demand for mobile data and voice access continues to increase, research and development also continue to advance the technologies not only to meet the growing demand for access, but to advance and enhance the user experience with user device. Some of the technologies that have evolved starting GSM/EDGE, UMTS/HSPA, CDMA2000/EV-DO and TD-SCDMA radio interfaces with the 3GPP Release 8, e-UTRA is designed to provide a single evolution path for providing increases in data speeds, and spectral efficiency, and allowing the provision of more functionality.

A 'smart computing device or user equipment (UE) or user device' refers to any electrical, electronic, electro-mechanical computing device or equipment or a combination of one or more of the above devices. Also, a 'smartphone' is one type of "smart computing device" that refers to a mobility wireless cellular connectivity device that allows end users to use services on cellular networks such as including but not limited to 2G, 3G, 4G and/or the like mobile broadband Internet connections with an advanced mobile operating system which combines features of a personal computer operating system with other features useful for mobile or handheld use. Furthermore, every such smart device has one or the other type of a subscriber identity module (SIM) card to connect to the network.

Furthermore, a UICC (Universal Integrated Circuit Card) is simply referred to as 'SIM' card herein. The UICC can have multiple applications like SIM (2G), USIM (3G/4G/5G), ISIM (IMS), eSIM etc. After SIM activation on a user equipment (UE) boot up, the UE selects the applications in the SIM, for example, USIM for 4G LTE. A SIM file system consists of Master File (MF), Dedicated Files (DFs) and Elementary Files (EFs). The MF is a unique mandatory file containing access conditions and other DFs and EFs. The DFs contain access conditions and optionally other DFs and EFs. The EFs contain the access conditions of data contained in them, but the EFs don't contain any additional files. A typical USIM application comprises many Elementary Files (EFs) and/or Dedicated Files (DFs). These files are used for controlling a UE's behaviour in a network, helping the UE to securely register to desired PLMNs, enabling and restricting certain services, maintaining status lists and parameters, etc.

Further, referring to FIG. 1, it illustrates an exemplary block diagram highlighting various aspects of a SIM card [120] configured at a user equipment [100], in accordance with exemplary embodiments of the present invention. The exemplary user equipment [100] as indicated in the FIG. 1 comprises at least one exemplary subscriber identity module (SIM) card/universal integrated circuit card (UICC) [120]. The SIM [120] is configured inside the user equipment [100] for providing various functionalities in accordance with the present disclosure. Also, in an implementation, the SIM [120] may also be an embedded SIM (eSIM). Furthermore, FIG. 1 depicts important subsystems and blocks of the SIM card [120] and of the user equipment (UE) [100] as an example. The SIM card [120] comprises of a microprocessor [120B], an I/O interface [120A] towards the UE [100], a random access memory (RAM) temporary storage [120 C], an EEPROM/Non-Volatile Memory (NVM) [120D] and a SIM file system [120E]. Further, the EEPROM [220D] consists at least of an operating system code and a code of other applications. In the SIM file system [120E], the USIM application comprises EF files like for example EF_SPN, EF_SPNI, EF_SPDI, EF_PNN, EF_PNNI, EF_UST, EF_OPL etc. Also, the user equipment [100] as depicted in the FIG. 1 further comprise a plurality of subsystems [102, 102A, 102B, 102C, 103, 104, 105 and 106], wherein said subsystems [102, 102A, 102B, 102C, 103, 104, 105 and 106] may include, but not limiting to, a modem subsystem [102] with a Baseband DSP processor [102C], RF section [102B] and other radio interfaces [102A]. The user equipment [100] may further include an antenna [107] for receiving and transmitting various wireless services. Also, the user equipment [100] may comprise an application processor [104], a memory subsystem [105], a power subsystem [106] and an external I/O interfaces subsystem [103].

Further, the Elementary File EF_SPN (Service Provider Name) is present in the Elementary File EF_UST (USIM Service Table) if service no 19 is available in EF_UST (USIM Service Table). Also, a brief of the EF_SPN (Service Provider Name) is illustrated in below provided Table 1. The Table 1 depicts the brief of the EF_SPN in accordance with the 3GPP standard.

TABLE 1

BRIEF OF EF$_{SPN}$

| Identifier: '6F46' | Structure: transparent | Optional |
|---|---|---|
| File Size: 17 bytes | | Update activity: low |
| Access Conditions: | | |
| READ | | ALWAYS |
| UPDATE | | ADM |
| DEACTIVATE | | ADM |
| ACTIVATE | | ADM |

| Bytes | Description | M/O | Length |
|---|---|---|---|
| 1 | Display Condition | M | 1 byte |
| 2 to 17 | Service Provider Name | M | 16 bytes |

The EF_SPN comprises a service provider name in a text format and appropriate requirements (i.e. display conditions/display bit conditions) to display a network operator information (i.e. an information comprising at least one of a service provider name and a network operator name) by the UE (User Equipment). The service provider name may also be provided in a graphical format in the EF_SPNI. The UE shall use the service provider name in the text format or the graphical format or both to display the service provider name at the UE. Further, referring to FIG. 2, the FIG. 2 illustrates in accordance with exemplary embodiments of the present disclosure, 8 display condition bits i.e. b1 [202], b2 [204], b3 [206] . . . b8 [216] to provide the UE various display conditions. Further, display bit condition (display condition) for the service provider name in respect to a registered PLMN is explained below with reference to the display condition bits as provided in FIG. 2:
1. When b1=0, display of the registered PLMN name is not required when the registered PLMN is either HPLMN or a PLMN in the service provider PLMN list.
2. When b1=1, display of the registered PLMN name is required when the registered PLMN is either HPLMN or a PLMN in the service provider PLMN list.
3. When b2=0, display of the service provider name is required when the registered PLMN is neither HPLMN nor a PLMN in the service provider PLMN list.
4. When b2=1, display of the service provider name is not required when the registered PLMN is neither HPLMN nor a PLMN in the service provider PLMN list.

Further, the Elementary File EF_SPDI (Service Provider Display Information) is present in the Elementary File EF_UST (USIM Service Table) if service no 51 is available in the EF_UST. Also, a brief of the EF_SPDI is illustrated below in Table 2.

TABLE 2

BRIEF OF EF$_{SPDI}$

| Identifier: '6FCD' | Structure: transparent | Optional |
|---|---|---|
| SFI: '1B' | | |
| File Size: x bytes | | Update activity: low |
| Access Conditions: | | |
| READ | | PIN |
| UPDATE | | ADM |
| DEACTIVATE | | ADM |
| ACTIVATE | | ADM |

| Bytes | Description | M/O | Length |
|---|---|---|---|
| 1 to x | TLV object(s) containing Service Provider information | M | x bytes |

The EF_SPDI comprises information regarding a service provider display i.e. a service provider PLMN list as provided in the Table 2. Furthermore, in TLV (Tag Length Value) provided under description section of the brief of the EF_SPDI as illustrated in the Table 2, a list of PLMNs coded as Mobile Country Code (MCC) followed by the Mobile Network Code (MNC) is defined in which the Service Provider Name shall be displayed.

Further, the Elementary File EF_PNN (PLMN Network Name) is present in the Elementary File EF_UST (USIM Service Table) if service no 45 is available in the EF_UST. Also, a brief of the EF_PNN is illustrated below in Table 3.

TABLE 3

BRIEF OF EF$_{PNN}$

| Identifier: '6FC5' | Structure: linear fixed | Optional |
|---|---|---|
| SFI: '19' | | |
| Record length: X bytes; X ≥ 3 | | Update activity: low |
| Access Conditions: | | |
| READ | | ALWAYS |
| UPDATE | | ADM |
| ACTIVATE | | ADM |
| DEACTIVATE | | ADM |

| Bytes | Description | M/O | Length |
|---|---|---|---|
| 1 to X | Network name TLV objects | M | X bytes |

The TLV (Tag Length Value) as provided under description section of the brief of the EF_PNN as illustrated in the Table 3 contains a full and a short form versions of a network name for a registered PLMN. The UE shall use these versions in place of its own versions of the network name for the PLMN (stored in the UE's memory list), and in place of the versions of the network name received when registered to the PLMN. The PLMN Network Name may also be provided in a graphical format in EF_PNNI.

Further, the Elementary File EF_OPL (Operator PLMN List) is present in the Elementary File EF_UST (USIM Service Table) if service no 46 is available in the EF_UST. Also, a brief of the EF_OPL is illustrated below in Table 4.

TABLE 4

BRIEF OF EF$_{OPL}$

| Identifier: '6FC6' | Structure: linear fixed | Optional |
|---|---|---|
| SFI: '1A' | | |
| Record length: X bytes, (X ≥ 8) | | Update activity: low |
| Access Conditions: | | |
| READ | | ALWAYS |
| UPDATE | | ADM |
| DEACTIVATE | | ADM |
| ACTIVATE | | ADM |

| Bytes | Description | M/O | Length |
|---|---|---|---|
| 1 to 7 | Location Area Identity/Tracking Area Identity | M | 7 bytes |
| 8 | PLMN Network Name Record Identifier | M | 1 byte |

The EF_OPL contains a prioritized list of Location Area Information/identity (LAI) or Tracking Area Identity (TAI) identities that are used to associate a specific operator name contained in EF_PNN or EF_PNNI with the LAI/TAI. The UE shall use the EF_OPL in association with the EF_PNN in place of any network name stored within the UE's internal list and any network name received when registered to the PLMN. The PLMN Network Name may also be provided in a graphical format in EF_PNNI. The UE shall use the text format or the graphical format or both to display the service provider name. Also, the Location Area Information comprises of the Mobile Country Code (MCC), Mobile Network Code (MNC) and Location Area Code (LAC). The Tracking Area Identity, comprises of the MCC, MNC and Tracking Area Code (TAC).

Also, a network information message is a message sent from a network to the UE. For example, an EMM (EPS Mobility Management) Information Message (i.e. the network information message) in 4G LTE Network is sent from the network to the UE anytime during an established EMM context. The EMM Information message contains:

Full Name for the network—The contents of this IE (Informational Element) indicate the "full-length name of the network" that the network wishes the UE to associate with the MCC and MNC contained in the last visited tracking area identification.

Short Name for the network—The contents of this IE indicate the "abbreviated name of the network" that the network wishes the UE to associate with the MCC and MNC contained in the last visited tracking area identification.

Furthermore, today service operator networks typically have thousands of device models (user equipment models) and the majority of these user equipment (UE) supports LTE, legacy technology and future 5G. Also, an operating system of the UE displays a name of a network or an appropriate network name abbreviation to which the UE is currently connected to. The operator name is usually displayed in a position which enables the customer to easily identify the connected network. Some of the exemplary display positions to display the name of the network or the appropriate network name abbreviation are depicted in the FIG. 3, in accordance with the exemplary embodiments of the present disclosure. In FIG. 3 at [302] a home screen user interface is depicted, wherein the home screen is a first screen which is displayed to a user when the user equipment/device is turned on or unlocked. Also, the home screen user interface [302] further at [302 A] depicts a Status/Notification bar, wherein the Status/Notification bar is a bar present at the top of the home screen and contains icons/information notifying the user of a network information such as a signal strength, a battery power status etc.

Thereafter in FIG. 3, at [304] a lock screen user interface is depicted, wherein the lock screen is the screen which is displayed to the user when the device (UE) is locked. Also, the lock screen user interface [304] further at [304 A] depicts a Status/Notification bar, wherein the Status/Notification bar is a bar present at the top of the lock screen and contains icons/information notifying the user of a network information such as a signal strength, a battery power status etc.

Next, at [306] and [308] an exemplary unlock screen user interface is depicted, wherein the unlock screen is the screen which is displayed when the UE is unlocked. Also, the unlock screen user interface [306] at [306 A] and the unlock screen user interface [308] at [308 A] further depicts two exemplary drag screens. The drag screen is a screen used to display information about an App and system notifications, it is often accessed by dragging down a Status/Notification Bar. Further, at the drag screens [306 A] and [308 A], Status/Notification Bar further depicts the exemplary network information provided at the drag screen [306 A] and [308 A].

Furthermore, the service/network operator information (i.e. the information comprising the at least one of the service provider name and the network operator name) that is to be displayed at the UE can be picked up by the operating system (OS) of the UE from the SIM card or from the network. This service/network operator information can be updated over-the-air. With the display options (for instance as depicted in FIG. 3) in perspective, a service/network operator can maximize the opportunity to customize/update the network operator information with an array of information texts/graphical images such as seasonal greetings, or information about a product or a service within the subscriber base. Hence from this, it is evident that there is a potential to customize the network operator information with the array of information texts/graphical images such as the seasonal greetings, or information about a product or any service within the subscriber base.

However, currently there is no method where the service/network providers customize/update values present in the fields of the network operator information over-the-air and add value to their services by displaying real time messages and updates.

Therefore, in view of these and other existing limitations, there is a need in the art to provide a novel technique/solution that can dynamically configure and customize/update the values of the fields of the network operator information over-the-air and add value to the service/network provider's services by displaying real-time messages and updates.

Therefore, in view of above and other existing limitations, there is an imperative need to provide a solution to overcome the existing limitations and to provide methods and systems of updating over-the-air the network operator information displayed at a user equipment.

SUMMARY OF THE DISCLOSURE

This section is provided to introduce certain objects and aspects of the present invention in a simplified form that are further described below in the detailed description. This summary is not intended to identify the key features or the scope of the claimed subject matter.

In order to overcome at least some of the drawbacks mentioned in the previous section and those otherwise known to persons skilled in the art, an object of the present disclosure is to provide a system and method of customizing and updating an information displayed at a user equipment, wherein the information further comprises at least one of a service provider name and a network operator name. Another object of the present disclosure is to provide a novel method to configure and customize values present in fields of the network operator information (i.e. the information further comprises at least one of the service provider name and the network operator name) over-the-air and to add value to the service/network provider's services by displaying real-time messages and updates at the user equipment. Also, an object of the present disclosure is to provide a novel mechanism where a service operator can maximize the opportunity to customize the network operator information with an array of information texts/graphical images such as seasonal greetings, or information about a product or a service within a subscriber base. Another object of the present disclosure is to provide a novel mechanism to analyze the methods (structure alignment and field information) at server for creating distinct groups (tagging relevant fields and structure) for different device/user equipment (UE) models to configure and customize the values of the fields. Also, one other object of the present disclosure is to provide a novel mechanism to modify a text/graphic image that can be displayed in a position which enables the customer to view it on either a Home Screen, a Drag Screen, a Lock Screen, an Unlock Screen, a Notification/Status bar etc. of the user equipment. Another object of the present disclosure is to provide a novel mechanism to gracefully update the values of the fields from time to time over-the-air. Also, an object of the present disclosure is to provide a novel mechanism to gracefully update the values of the fields to provide at the user equipment region-wise real-time updates. Another object of the present disclosure is to provide a novel mechanism to gracefully update the values of the fields where the updates are non-service impacting and can be updated when there is no on-going session on the UE. Yet another object of the present disclosure is to provide a novel mechanism to gracefully update the values of the fields where the updates are non-service impacting and can be updated in night hours, when most of the devices are on low use. Yet another object of the present disclosure is to provide users with an enhanced experience by gracefully updating the values of the fields. Yet another object of the present disclosure is to provide a method that can be used across vendors in a Heterogeneous Network for multi-sim devices.

In order to achieve the aforementioned objectives, the present invention provides a method and system for customizing and updating an information displayed at a user equipment, wherein the information further comprises at least one of a service provider name and a network operator name. A first aspect of the present invention relates to a method of updating an information displayed at a user equipment. The method comprises transmitting, via a SIM OTA update to a SIM card configured at a user equipment, a display bit condition, wherein the display bit condition comprises a condition to display at the user equipment the information comprising at least one of a service provider name and a network operator name present in at least one of a SIM information and a network information message. The method thereafter encompasses updating, via a network entity, the information provided in at least one of the SIM information and the network information message. Further, the method comprises transmitting, from the network entity to the user equipment, the updated information, to display in real-time the updated information at the user equipment based on the display bit condition.

Another aspect of the present invention relates to a system updating an information displayed at a user equipment, wherein the information further comprises at least one of a service provider name and a network operator name. The system comprises a transceiver unit configured to transmit a display bit condition via a SIM OTA update to a SIM card configured at a user equipment, wherein the display bit condition comprises a condition to display at the user equipment the information comprising at least one of the service provider name and the network operator name present in at least one of a SIM information and a network information message. The system thereafter comprises a processing unit connected to the transceiver unit, the processing unit is configured to update via a network entity, the information provided in at least one of the SIM information and the network information message. Also, the transceiver unit is further configured to transmit, from the network entity to the user equipment, the updated information, to display in real-time the updated information at the user equipment based on the display bit condition.

BRIEF DESCRIPTION OF DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components, electronic components or circuitry commonly used to implement such components.

Figure 1:
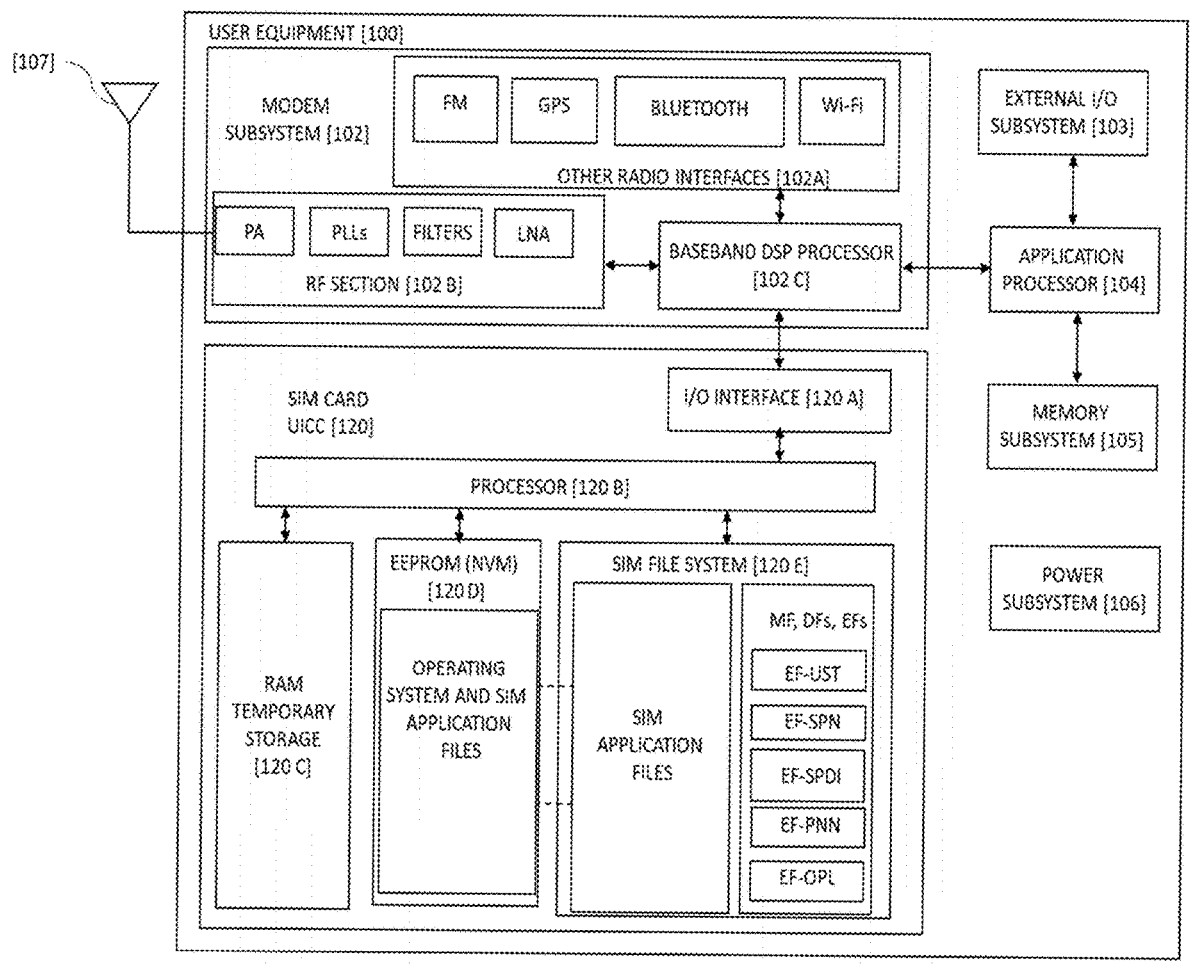
FIG. 1 illustrates an exemplary block diagram highlighting various aspects of a SIM card [120] configured at a user equipment [100], in accordance with exemplary embodiments of the present disclosure.
Figure 2:
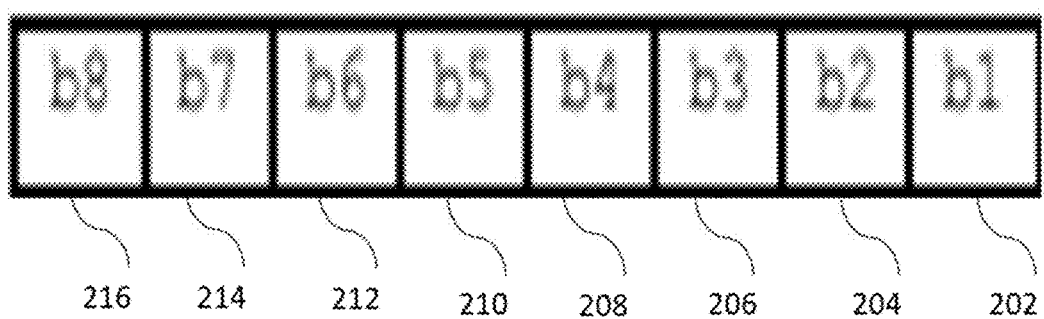
FIG. 2 illustrates 8 display condition bits i.e. b1 [202], b2 [204], b3 [206] . . . b8 [216], to provide a UE various display conditions, in accordance with exemplary embodiments of the present disclosure.
Figure 3:
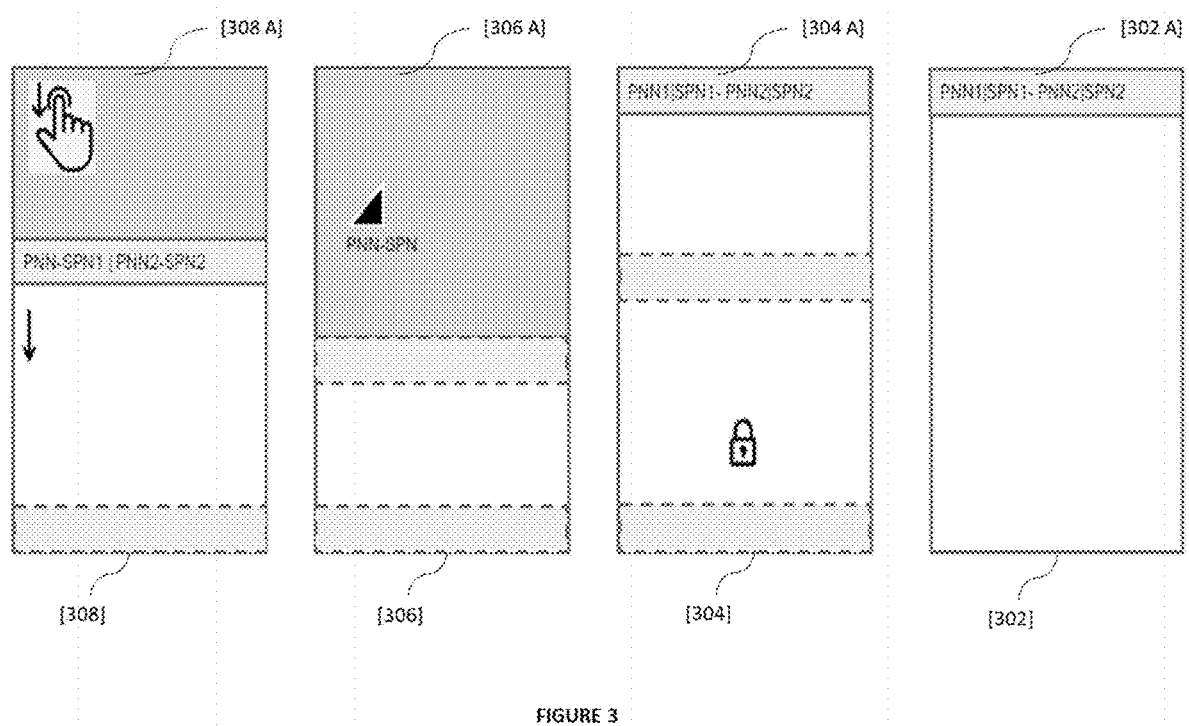
FIG. 3 illustrates exemplary display positions to display a name of a network or an appropriate network name abbreviation, in accordance with exemplary embodiments of the present disclosure.

The foregoing shall be more apparent from the following more detailed description of the disclosure.

DESCRIPTION OF THE INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a sequence diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As utilized herein, terms "component," "system," "platform," "node," "layer," "selector," "interface," and the like are intended to refer to a computer-related entity, hardware, software (e.g., in execution), and/or firmware. For example, a component can be a process running on a processor, a processor, an object, an executable, a program, a storage device, and/or a computer. By way of illustration, an application running on a server and the server can be a component. One or more components can reside within a process and a component can be localized on one computer and/or distributed between two or more computers.

Further, these components can execute from various computer-readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software application or a firmware application executed by a processor, wherein the processor can be internal or external to the apparatus and executes at least a part of the software or firmware application. As yet another example, a component can be any apparatus that provides specific functionality through electronic components without mechanical parts, the electronic components can include a processor therein to execute software or firmware that confers at least in part the functionality of the electronic components.

In addition, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc™ (BD); smart card(s), flash memory device(s) (e.g., card, stick, key drive etc.).

Moreover, terms like "user equipment" (UE), "mobile station", "user device", "mobile subscriber station," "access terminal," "terminal," "smartphone," "smart computing device," "handset," "device" and similar terminology refers to any electrical, electronic, electro-mechanical or an equipment or a combination of one or more of the above devices. Smart computing devices may include, but not limited to, a mobile phone, smart phone, virtual reality (VR) devices, augmented reality (AR) devices, pager, laptop, a general-purpose computer, desktop, personal digital assistant, tablet computer, mainframe computer, or any other computing device as may be obvious to a person skilled in the art. In general, a smart computing device is a digital, user configured, computer networked device that can operate autonomously. A smart computing device is one of the appropriate systems for storing data and other private/sensitive information. The said device operates at all the seven levels of ISO reference model, but the primary function is related to the application layer along with the network, session and presentation layer with any additional features of a touch screen, apps ecosystem, physical and biometric security, etc. Further, a 'smartphone' is one type of "smart computing device" that refers to the mobility wireless cellular connectivity device that allows end-users to use services on 2G, 3G, 4G, 5G and the like mobile broadband Internet connections with an advanced mobile operating system which combines features of a personal computer operating system with other features useful for mobile or handheld use. These smartphones can access the Internet, have a touchscreen user interface, can run third-party apps including the capability of hosting online applications, music players and are camera phones possessing high-speed mobile broadband 4G LTE internet with video calling, hotspot functionality, motion sensors, mobile payment mechanisms and enhanced security features with alarm and alert in emergencies. Mobility devices may include smartphones, wearable devices, smartwatches, smart bands, wearable augmented devices, etc. For the sake of specificity, we will refer to the mobility device to both feature phone and smartphones in this disclosure but will not limit the scope of the disclosure and may extend to any mobility device in implementing the technical solutions. The above smart devices including the smartphone as well as the feature phone including IoT devices enable the communication on the devices. Also, every smart device as disclosed herein has one or the other type of a SIM card to connect to a network and to implement the features of the present invention. Furthermore, the foregoing terms are utilized interchangeably in the subject specification and related drawings.

Furthermore, the terms "user," "subscriber," "customer," "consumer," "agent,", "owner," and the like are employed interchangeably throughout the subject specification and related drawings, unless context warrants particular distinction(s) among the terms. It should be appreciated that such terms can refer to human entities, or automated components supported through artificial intelligence, e.g., a capacity to make inference based on complex mathematical formulations, that can provide simulated vision, sound recognition, decision making, etc. In addition, the terms "wireless network" and "network" are used interchangeable in the subject application, unless context warrants particular distinction(s) among the terms.

As used herein, a "processor" or "processing unit" includes one or more processors, wherein processor refers to any logic circuitry for processing instructions. A processor may be a general-purpose processor, a special-purpose processor, a conventional processor, a digital signal processor, a plurality of microprocessors, one or more microprocessors in association with a DSP core, a controller, a microcontroller, a low-end microcontroller, Application Specific Integrated Circuits, Field Programmable Gate Array circuits, any other type of integrated circuits, etc. The processor may perform signal coding data processing, input/output processing, and/or any other functionality that enables the working of the system according to the present disclosure. More specifically, the processor or processing unit is a hardware processor.

As used herein the "Transceiver Unit" may include but not limited to a transmitter to transmit data to one or more destinations and a receiver to receive data from one or more sources. Further, the Transceiver Unit may include any other similar unit obvious to a person skilled in the art, to implement the features of the present invention.

As used herein, "Storage Unit" or "Memory Unit" refers to a machine or computer-readable medium including any mechanism for storing information in a form readable by a computer or similar machine. For example, a computer-readable medium includes read-only memory ("ROM"), random access memory ("RAM"), magnetic disk storage media, optical storage media, flash memory devices or other types of machine-accessible storage media.

The present invention provides a value addition with a novel method and system to a service/network provider whereby customized messages and updates can be pushed over the air from a network to a subscriber identity module (SIM) card/device(s), wherein the SIM card/SIM is configured at the device/user equipment and the SIM card is not limited to any single form factor and in an implementation it may also include an embedded SIM. The present invention is an enhancement to extend customizable message in the SIM devices. More particularly the present invention provides a novel method and system of customizing/updating an information displayed at the user equipment, wherein the information further comprises at least one of a service provider name and a network operator name. The present invention provides a solution to configure and customize values present in various fields of said information over-the-air and to add value to service/network provider's services by displaying real-time messages and updates at the user equipment. Furthermore, by implementing the features of the present invention a service/network operator can customize/update the information with an array of information texts/graphical images such as seasonal greetings, or information about a product or a service within a subscriber base. Further, the present invention in order to update information displayed at the user equipment encompasses updating an information comprising at least one of a service provider name and a network operator name, provided in at least one of a SIM information and a network information message. Further, the present invention encompasses transmitting, to the user equipment, the updated information, to display in real time the updated information at the user equipment based on a display bit condition, wherein the display bit condition is provided at the SIM card configured at the user equipment via a SIM OTA (over the air) update.

Hereinafter, exemplary embodiments of the present disclosure will be described in detail with reference to the accompanying drawings so that those skilled in the art can easily carry out the present disclosure.

Figure 4:
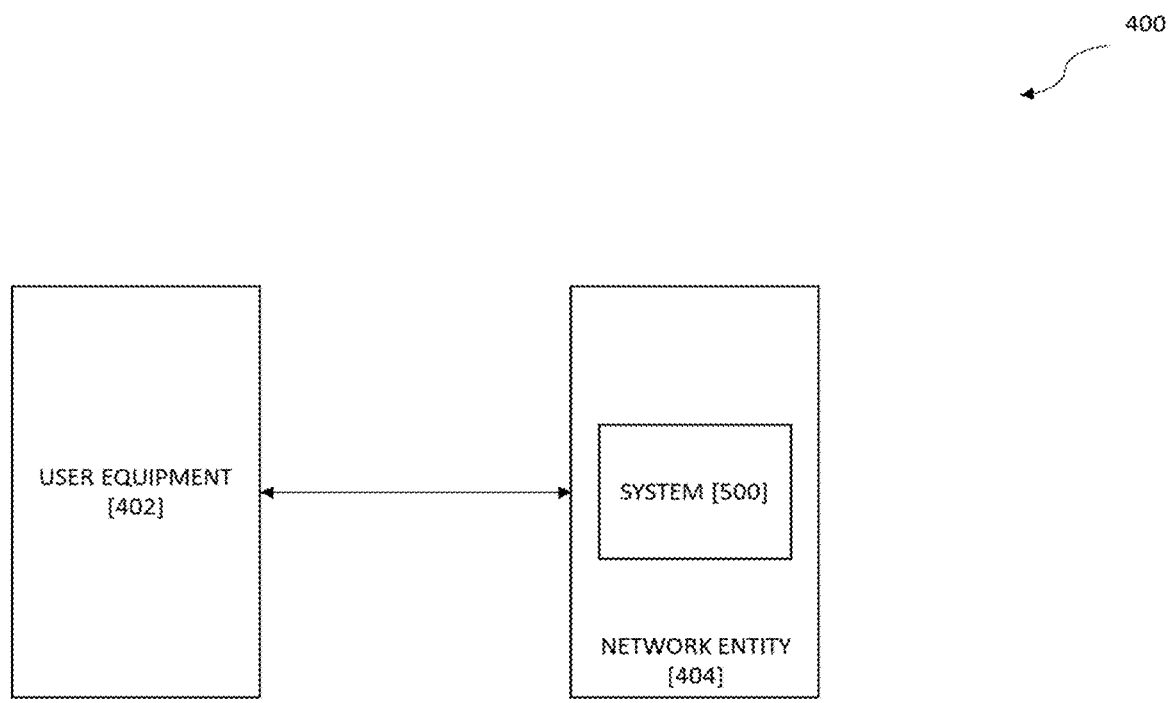
FIG. 4 illustrates an exemplary block diagram depicting an exemplary network architecture diagram [400], in accordance with exemplary embodiments of the present disclosure.

Referring to FIG. 4, an exemplary block diagram depicting an exemplary network architecture diagram [400], in accordance with exemplary embodiments of the present disclosure is shown.

As shown in FIG. 4, the exemplary network architecture diagram [400] comprises at least one user equipment [402] connected to at least one network entity [404], wherein the network entity [404] further comprises a system [500] configured to implement the feature of the present invention. Also, the user equipment [402] further comprises at least one subscriber identity module (SIM) card, wherein the SIM card is not limited to any single form factor and in an implementation, it may also include an embedded SIM. Furthermore, the network entity [404] is one of a SIM OTA (over the air) server unit and a core network unit. Also, in FIG. 4 only the single user equipment and the single network entity is shown, however, there may be multiple such user equipment and/or network entities or there may be any such numbers of said user equipment and/or network entities obvious to a person skilled in the art or as required to implement the features of the present disclosure.

Further, whenever the user equipment [402] comprising the SIM card is powered-up, the user equipment [402] initiates registration with a network. For instance, considering a Long-Term Evolution (LTE) attach flow for data and IMS bearers when the user equipment [402] is powered-up, the user equipment [402] initiates a registration with the network on "Primary Internet/Data" APN. Thereafter, upon completion of initial attach with the primary APN, the user equipment [402] initiates a PDN connectivity request with the network for "IMS" APN for Voice service. Thus, the user equipment [402] have two APNs, the Primary APN (Operator specific) for Data and the "IMS" for Voice with one default bearer for each APN. Further, after the Attach Complete for the primary APN, a network information message (i.e. an EMM Information message in 4G LTE Network) is sent from the core network unit (i.e. from the network entity [404]) towards the user equipment [402], wherein the EMM Information message contains an information for a full/short name for the network to be displayed on the user equipment [402]. In an implementation, the core network unit may be a mobility management entity (MME). Also, further, the SIM OTA (Over-The-Air) server unit (i.e. the network entity [404]) is required for updating and provisioning of important SIM files (such as EF_UST, EF_SPN, EF_SPDI, EF_PNN, EF_OPL and the like files required to implement the features of the present invention) and applets present inside the SIM card for proper interworking of the user equipment [402] with the network. Also, for the proper interworking of the user equipment [402] with the network, a communication between the SIM OTA (Over-The-Air) server unit and the SIM card of the user equipment [402] may be initiated by one of an HTTP Push, an HTTP Pull or a SIM Over-The-Air (OTA) SMS upgrade mechanism.

Figure 5:
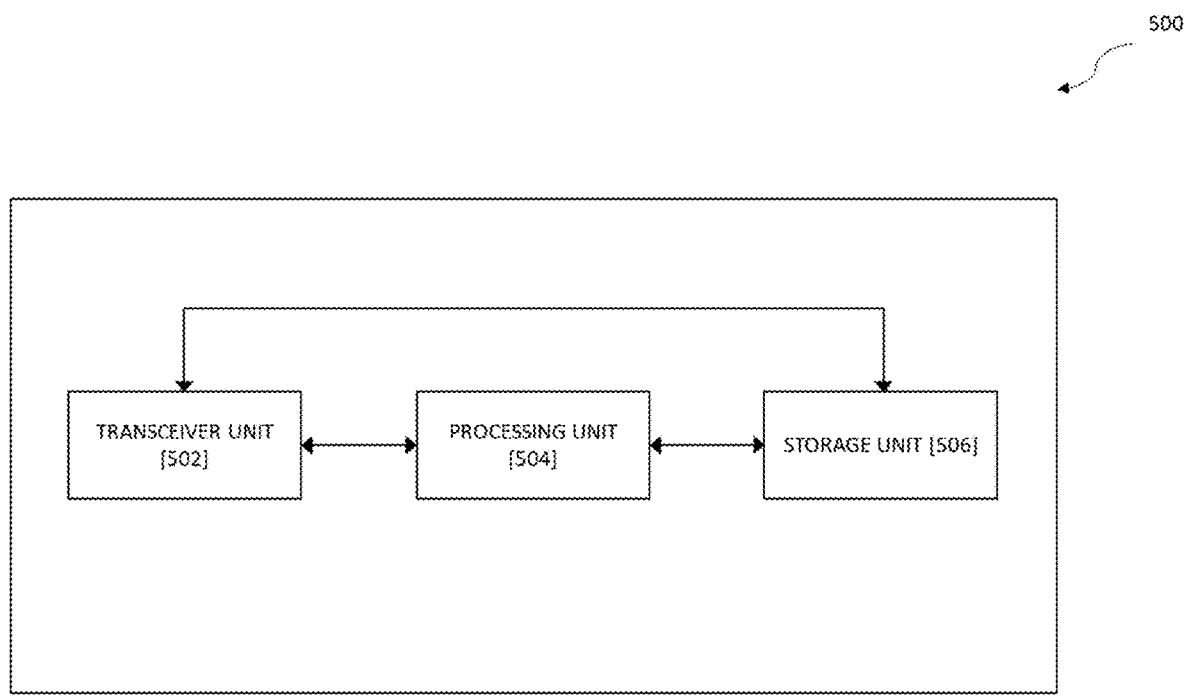
FIG. 5 illustrates an exemplary block diagram of a system [500] of updating an information displayed at a user equipment, in accordance with exemplary embodiments of the present disclosure.

Referring to FIG. 5, an exemplary block diagram of a system [500] for updating an information displayed at a user equipment [402], in accordance with exemplary embodiments of the present disclosure is shown. Also, the information displayed at the user equipment [402] further comprises at least one of a service provider name and a network operator name.

The system [500] comprises at least one transceiver unit [502], at least one processing unit [504] and at least one storage unit [506]. In an implementation the system [500] resides at the network entity [404], wherein the network entity [404] is connected to the user equipment [402]. The network entity [404] is one of the SIM OTA server unit and the core network unit. The user equipment [402] further comprises at least one subscriber identity module (SIM) card, wherein the SIM card is not limited to any single form factor and in an implementation it may also include an embedded SIM. Also, all of the components/units of the system [500] are assumed to be connected to each other unless otherwise indicated below. Also, in FIG. 5 only a few units are shown, however, the system [500] may comprise multiple such units or the system [500] may comprise any such numbers of said units, obvious to a person skilled in the art or as required to implement the features of the present disclosure.

The system [500], is configured to update the information displayed at the user equipment [402], with the help of the interconnection between its components/units.

The at least one transceiver unit [502] is connected to the at least one processing unit [504] and the at least one storage unit [506]. The transceiver unit [502] is configured to transmit a display bit condition via a SIM OTA update to the SIM card configured at the user equipment [402], wherein the display bit condition comprises a condition to display at the user equipment [402] the information present in at least one of a SIM information and a network information message. The information comprises of at least one of a service provider name and a network operator name. Further, in an implementation in a 4G Long-Term Evolution (LTE) network, to depict expected results when both the service provider name (SPN) and PLMN network name (PNN) are burned inside the SIM, various display bit conditions/display conditions that may be provided in an EF_SPN file via the SIM OTA update are provided below in Table 5:

TABLE 5

Display conditions in EF_SPN file

| Display Conditions in EF_SPN | | Expected results when both SPN and PNN are burned inside the SIM | | | |
|---|---|---|---|---|---|
| | | Home | | Roaming | |
| B2 | B1 | SPN | PNN | SPN | PNN |
| 0 | 0 | May be displayed | Not displayed | Displayed | May be displayed |
| 0 | 1 | May be displayed | Displayed | Displayed | May be displayed |
| 1 | 0 | May be displayed | Not displayed | Not displayed | May be displayed |
| 1 | 1 | May be displayed | Displayed | Not displayed | May be displayed |

Further, in said 4G Long-Term Evolution (LTE) network, the transceiver unit [502] is further configured to transmit the display bit condition/s via the SIM OTA update to the SIM card configured at the user equipment [402] for at least one of the EF_SPN file, an EF_SPNI file, an EF_SPDI file, an EF_PNN file, an EF_PNNI file and an EF_OPL file. The display bit condition/s is transmitted for at least one of the EF_SPN file, the EF_SPNI file and the EF_SPDI file to control a display of the service provider name (SPN) and the display bit condition/s is transmitted for at least one of the EF_PNN file, the EF_PNNI file and the EF_OPL file to control a display of the network operator name.

Further, if in an implementation if the SIM card is not pre-configured with SIM files (for instance with the EF_SPN/EF_PNN files in the 4G LTE network) for the display of service provider name or PLMN network name, an operating system (OS) of the user equipment [402] in such scenario picks up the network operator name received in the network information message (for instance an EMM Information message in the 4G LTE network) to further display it on various screens of the user equipment [402] like a Home screen, a Lock screen, a Drag Screen, a Notification bar etc.

The at least one processing unit [504] is connected to the at least one transceiver unit [502] and the at least one storage unit [506]. The processing unit [504] connected to the transceiver unit [502] is configured to update via the network entity [404], the information provided in at least one of the SIM information and the network information message. Also, the network entity [404] is one of a SIM OTA server unit and a core network unit. Further, the processing unit [504] is configured to update the information provided in the SIM information via the SIM OTA server unit. The processing unit [504] to update via the SIM OTA server unit, the information provided in the SIM information is further configured to update via the SIM OTA server unit an information present in at least one SIM file. For instance, in the 4G LTE network, the processing unit [504] to update via the SIM OTA server unit, the information provided in the SIM information is configured to update via the SIM OTA server unit an information present in at least one of an EF_SPN file and an EF_PNN file.

Also, the processing unit [504] is configured to update the information provided in the network information message via the core network unit. In an implementation in the 4G LTE network, processing unit [504] is configured to update the information (i.e. a Full/Short name of network operator) provided in the EMM Information message (i.e. the network information message) via the core network unit, wherein the core network unit in such implementation may be an MME of the 4G LTE network to which the user equipment [402] is connected. Further, the processing unit [504] to update via the core network unit, the information provided in the network information message is further configured to update via the core network unit a text string at least under a name of the network operator. For instance, in the 4G LTE network, the processing unit [504] to update via the MME, the information provided in the EMM information message is configured to update/customize via the MME a text string under at least one of a full name of the network operator and a short name of the network operator.

Also, in an implementation the processing unit [504] is configured to update via the network entity [404], the information provided in at least one of the SIM information and the network information message in non-peak hours without causing any downtime to on-going services in peak hours. Furthermore, the processing unit [504] is configured to update via the network entity [404], the information (i.e. at least one of the service provider name and the network operator name) provided in at least one of the SIM information and the network information message to add value to service/network provider's services by updating at least one of the service provider name and the network operator name with an array of information texts/graphical images such as Seasonal Greetings, Promotions, Social messages, Vaccination drives, Health Alerts, Disaster warnings, Indication of new plans or services or products launched by the service/network operator etc.

Thereafter, the transceiver unit [502] is further configured to transmit, from the network entity [404] to the user equipment [402], the updated, to display in real-time the updated information at the user equipment [402] based on the display bit condition. The updated information further comprises at least one of an updated SIM information and an updated network information message. The updated SIM information further comprises at least one of an updated customizable text and an updated customizable graphical image.

Also, the transceiver unit [502] is further configured to transmit via the SIM OTA server unit to the SIM card configured at the user equipment [402], the updated SIM information based on one of an HTTP Push, an HTTP Pull and SIM Over-The-Air (OTA) SMS upgrade mechanism. The file updating is followed by a SIM refresh (proactive) command in the same HTTP session, so that all values of the SIM card are refreshed and synced with the user equipment [402]. For instance, in the 4G LTE network the transceiver unit [502] is configured to transmit via the SIM OTA server unit to the SIM card configured at the user equipment [402], the updated information present in at least one the EF_SPN file and the EF_PNN file based on one of the HTTP Push, the HTTP Pull and the SIM Over-The-Air (OTA) SMS upgrade mechanism.

Further, the transceiver unit [502] is also configured to transmit via the core network unit to the user equipment [402] the updated network information message based on one of a Detach with Re-attach message and a tracking area update (TAU). The TAU procedure may be initiated when the user equipment [402] enters a new tracking area (TA) that is not in the list of Tracking Area Identities (TAIs) allocated by the core network unit at the time of the user equipment's attach, or when the TAU timer expires in case of a Periodic TAU. For instance, in the 4G LTE network, the transceiver unit [502] is configured to transmit via the MME to the user equipment [402], the text string updated under at least one of the full name of the network operator and the short name of the network operator in the updated EMM information message based on one of a Detach Request from the network with detach type—re-attach required and a tracking area update (TAU).

Figure 6:
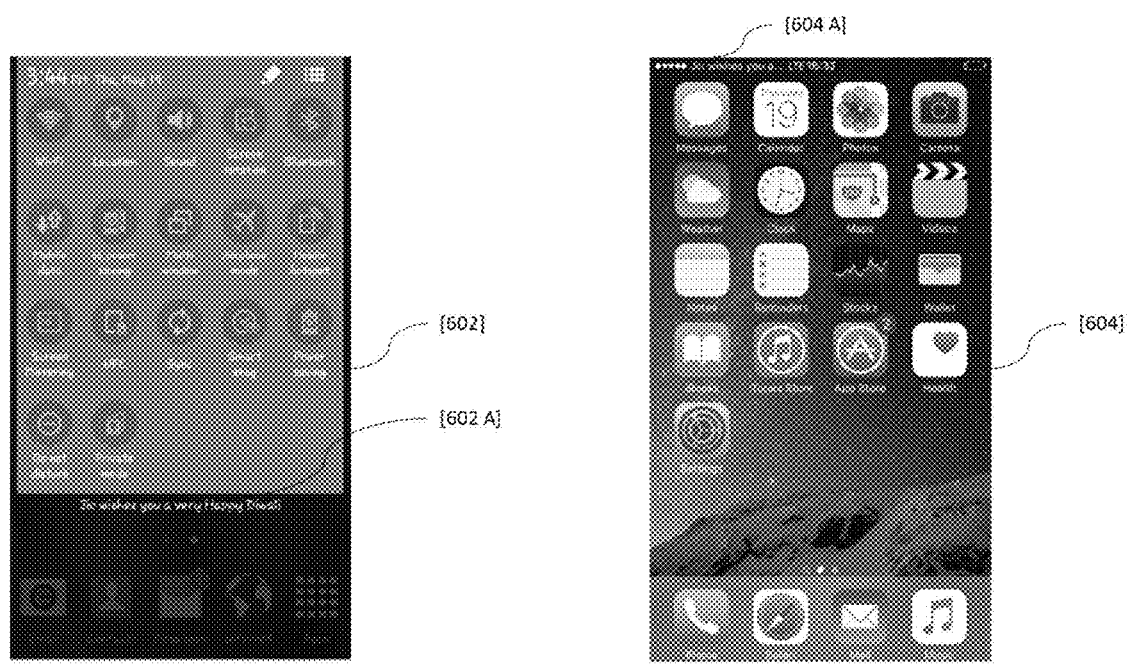
FIG. 6 illustrates two exemplary user interfaces, in accordance with exemplary embodiments of the present disclosure.

Thereafter, once the updated information is transmitted at the user equipment [402], the operating system of the user equipment [402] based on the display bit condition, displays the updated information on various screens of the user equipment [402] like on the Home screen, the Lock screen, the Drag Screen, the Notification bar etc. Also, based on the implementation of the features of the present disclosure the updated/modified information may be displayed over-the-air to all users or a set of users (region wise). Further, referring to FIG. 6, two exemplary user interfaces [602] and [604], in accordance with exemplary embodiments of the present disclosure are shown. The exemplary user interface [602] at [602 A] depicts an exemplary updated information (i.e. Jio/Network Operator wishes you a very Happy Diwali) displayed at the exemplary user interface [602] of a user equipment based on the implementation of the features of the present invention. Also, the exemplary user interface [604] at [604 A] depicts an exemplary updated information (i.e. Jio wishes you a . . . ) displayed at the exemplary user interface [604] of the user equipment based on the implementation of the features of the present invention. Also, said updated information may be displayed based on at least one of the updated SIM information and the updated network information message based on the implementation of the features of the present invention.

Further in an embodiment, a non-exhaustive list of exemplary alternatives in a 4G LTE network with different display combinations in accordance with the implementation of the features of the present invention is presented below:

Option 1: EF_SPN and EF_PNN Both Present in the SIM
   Preconditions:
      Service no 19 is enabled in EF_UST for EF_SPN file
      Service no 51 is enabled in EF_UST for EF_SPDI file
      Service no 45 is enabled in EF_UST for EF_PNN file
   Procedure:
      UE has received EMM Information message.
      Update EF_SPDI file over the air with list of service operator defined PLMNs in which the customizable text message is to be displayed.
      Update Service Provider Name field EF_SPN file and Full/Short PLMN field in EF_PNN file over the air with necessary customizable text message to be displayed as per display conditions below.

Display Conditions and Expected Results as per the display conditions as provided in the Table 5 above.

The EF_PNN value will override the network name values received in EMM Information message.

Figure 7:
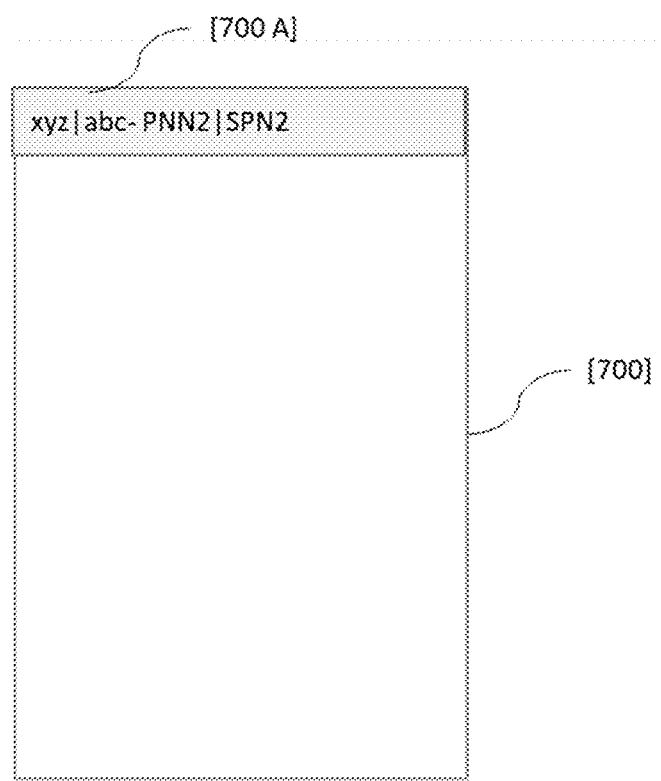
FIG. 7 illustrates an exemplary use case, in accordance with exemplary embodiments of the present disclosure.

Further, FIG. 7 depicts an exemplary use case in accordance with the above provided exemplary option 1, where for operator: 1 (SIM1) of a user equipment [402], the updated information is provided at the user equipment [402] as below:

EF_SPN:abc
EF_PNN: xyz
EMM Message: efg

The FIG. 7, at [700] depicts an exemplary user interface of the user equipment [402], wherein the user interface [700] further at [702] depicts the updated information displayed at the user equipment, wherein the updated information i.e. xyz|abc is displayed in place of PNN1|SPN1 (PLMN network name1|Service provider name1) in accordance with the above explained option 1.

Option 2: EF_PNN is Present and EF_SPN Service is Disabled

Preconditions:
Service no 19 is disabled in EF_UST for EF_SPN file
Service no 51 is enabled in EF_UST for EF_SPDI file
Service no 45 is enabled in EF_UST for EF_PNN file Procedure:
UE has received EMM Information message.
Update EF_SPDI file over the air with list of service operator defined PLMNs in which the customizable text message is to be displayed.
Update Full/Short PLMN field in EF_PNN file over the air with necessary customizable text message to be displayed as per display conditions in Table 5.

Expected Results as per display condition in Table 5:
When no 19 service is disabled in EF_UST for EF_SPN file, then EF_PNN value will be used to display the customizable/updated text in Home and Roaming scenarios. The EF_PNN value will override the network name values received in EMM Information message.

Figure 8:
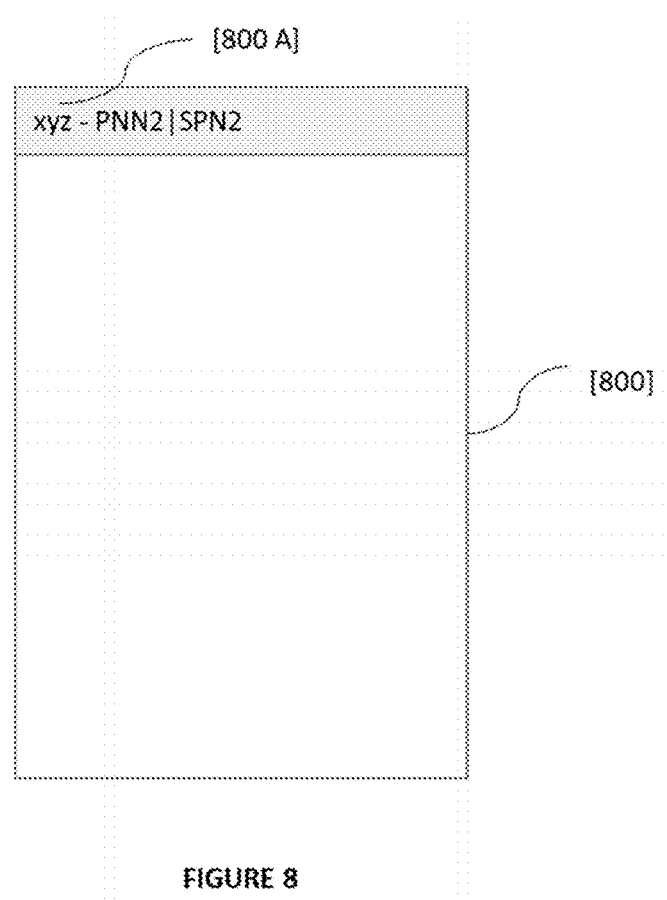
FIG. 8 illustrates an exemplary use case, in accordance with exemplary embodiments of the present disclosure.

Further, FIG. 8 depicts an exemplary use case in accordance with the above provided exemplary option 2, where for operator: 1 (SIM1) of a user equipment [402], the updated information is provided at the user equipment [402] as below:

EF_SPN: "Disabled"
EF_PNN: xyz
EMM Message: efg

The FIG. 8, at [800] depicts an exemplary user interface of the user equipment [402], wherein the user interface [800] further at [802] depicts the updated information displayed at the user equipment, wherein the updated information i.e. xyz is displayed in place of PNN1|SPN1 in accordance with the above explained option 2.

Option 3: Blank Values in EF_SPN when EF_PNN is Present

Preconditions:
Service no 19 is enabled in EF_UST for EF_SPN file
Service no 51 is enabled in EF_UST for EF_SPDI file
Service no 45 is enabled in EF_UST for EF_PNN file Procedure:
UE has received EMM Information message.
Update EF_SPDI file over the air with list of service operator defined PLMNs in which the customizable text message is to be displayed.
Update EF_SPN file over the air, where Service Provider name left blank (FF . . . FF)
Update Full/Short PLMN field in EF_PNN file over the air with necessary customizable text message to be displayed as per display conditions in Table 5

Expected Results as per display condition in Table 5:
When EF_SPN file is left blank, then the EF_PNN value will be used to display the customizable/updated text in Home and Roaming scenarios. The EF_PNN value will override the network name values received in EMM Information message.

Figure 9:
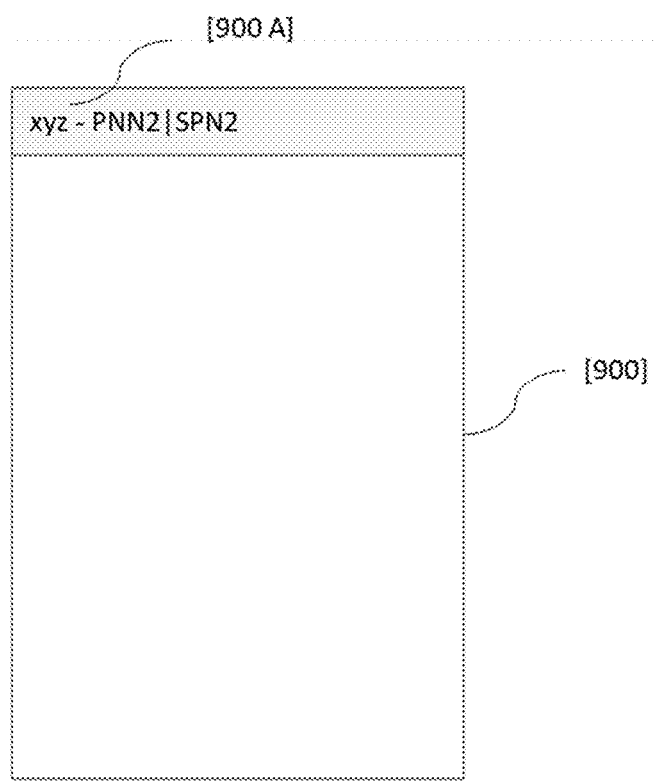
FIG. 9 illustrates an exemplary use case, in accordance with exemplary embodiments of the present disclosure.

Further, FIG. 9 depicts an exemplary use case in accordance with the above provided exemplary option 3, where for operator: 1 (SIM1) of a user equipment [402], the updated information is provided at the user equipment [402] as below:

EF_SPN: "Blank"
EF_PNN: xyz
EMM Message: efg

The FIG. 9, at [900] depicts an exemplary user interface of the user equipment [402], wherein the user interface [900] further at [902] depicts the updated information displayed at the user equipment, wherein the updated information i.e. xyz is displayed in place of PNN1|SPN1 in accordance with the above-explained option 3.

Option 4: Blank Values in EF_SPN and EF_PNN

Preconditions:
Service no 19 is enabled in EF_UST for EF_SPN file
Service no 51 is enabled in EF_UST for EF_SPDI file
Service no 45 is enabled in EF_UST for EF_PNN file Procedure:
UE has received EMM Information message.
Update EF_SPDI file over the air with a list of service operator-defined PLMNs in which the customizable text message is to be displayed.
Update EF_SPN file over the air, where Service Provider name left blank (FF . . . FF)
Update EF_PNN file over the air, where Full and Short network name is left blank (FF . . . FF)

Expected Results as per the display condition in Table 5:
When EF_SPN and EF_PNN files are left blank, then Network Name in EMM Information message can be used to display the customizable/updated text in Home and Roaming scenarios. Text from EMM Information message can also be used even when EF_SPN and EF_PNN files are disabled.

Figure 10:
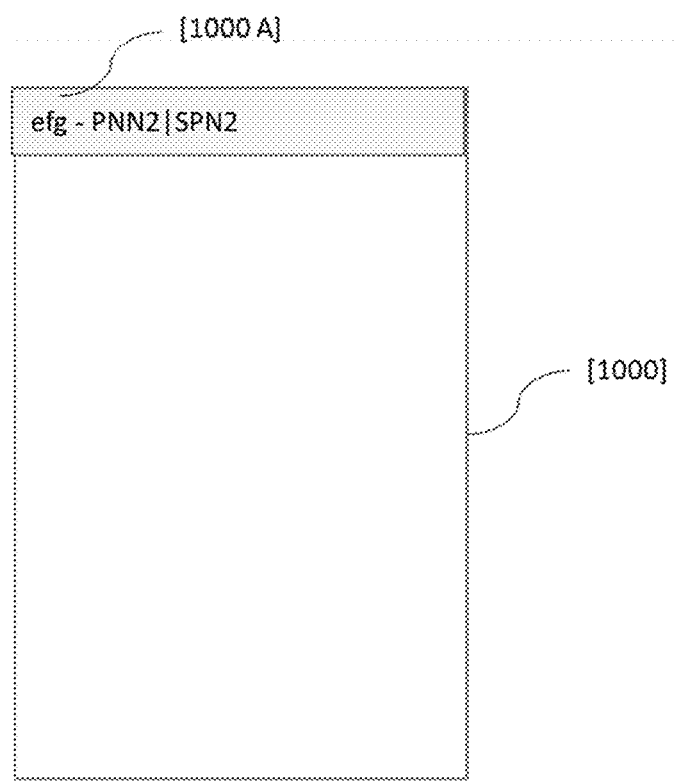
FIG. 10 illustrates an exemplary use case, in accordance with exemplary embodiments of the present disclosure.

Further, FIG. 10 depicts an exemplary use case in accordance with the above provided exemplary option 4, where for operator: 1 (SIM1) of a user equipment [402], the updated information is provided at the user equipment [402] as below:

EF_SPN: "Blank"
EF_PNN: "Blank"
EMM Message: efg

The FIG. 10, at [1000] depicts an exemplary user interface of the user equipment [402], wherein the user interface [1000] further at [1002] depicts the updated information displayed at the user equipment, wherein the updated information i.e. efg is displayed in place of PNN1|SPN1 in accordance with the above-explained option 4.

Option 5: Blank/Disabled Values in EF_PNN when EF_SPN is Present

Preconditions:
Service no 19 is enabled in EF_UST for EF_SPN file
Service no 51 is enabled in EF_UST for EF_SPDI file
Service no 45 is enabled/disabled in EF_UST for EF_PNN file Procedure:
UE has received EMM Information message.
Update EF_SPDI file over the air with a list of service operator-defined PLMNs in which the customizable text message is to be displayed.
Update EF_PNN file over the air, where Full and Short network name is left blank (FF . . . FF), incase service for EF_PNN file has been enabled.
Expected Results as per display condition in Table 5:
When EF_PNN file is left blank/disabled, then Network Name in EMM Information message and the EF_SPN value may be used to display the customizable/updated text.

Figure 11:
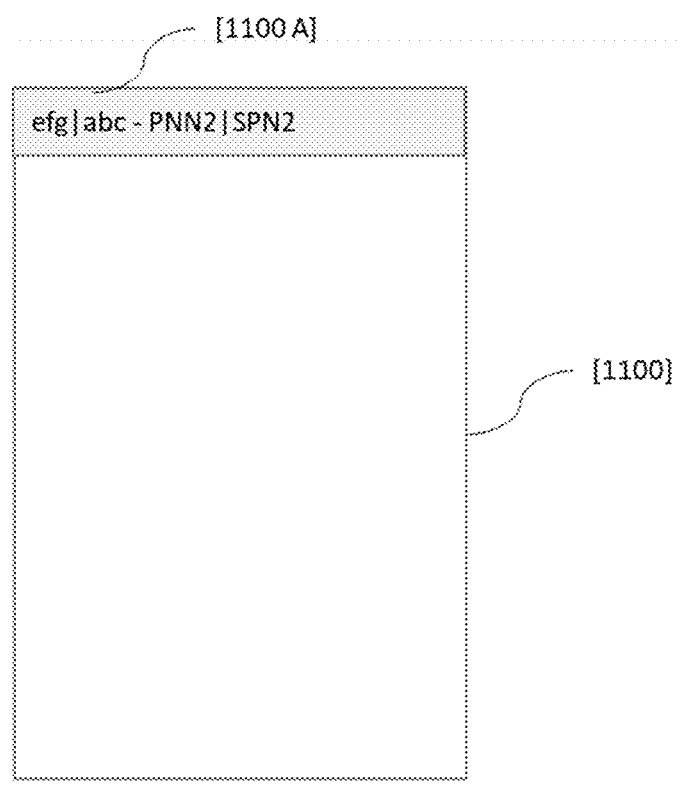
FIG. 11 illustrates an exemplary use case, in accordance with exemplary embodiments of the present disclosure.

Further, FIG. 11 depicts an exemplary use case in accordance with the above provided exemplary option 5, where for operator: 1 (SIM1) of a user equipment [402], the updated information is provided at the user equipment [402] as below:
EF_SPN:abc
EF_PNN: "Blank"/"Disabled"
EMM Message: efg The FIG. 11, at [1100] depicts an exemplary user interface of the user equipment [402], wherein the user interface [1100] further at [1102] depicts the updated information displayed at the user equipment, wherein the updated information i.e. efg|abc is displayed in place of PNN1|SPN1 in accordance with the above-explained option 5.

Also, in an embodiment in general, irrespective of the operating system, the SIM slot selection by the OS or related application modules using SIM/SIM slot information are different based on different OEM vendor implementation. The SIM slot selection is one such field which is customized by different OEM vendors or within different models of the same OEM.

Furthermore, the implementation of the features of the present invention is not limited to a specific network type (such as 4G LTE network) and the features of the present invention may be implemented in any network as obvious to a person skilled in the art. Also, the implementation of the features of the present invention is not limited to a Home Network and it can be extended to a National as well as an International Roaming.

Figure 12:
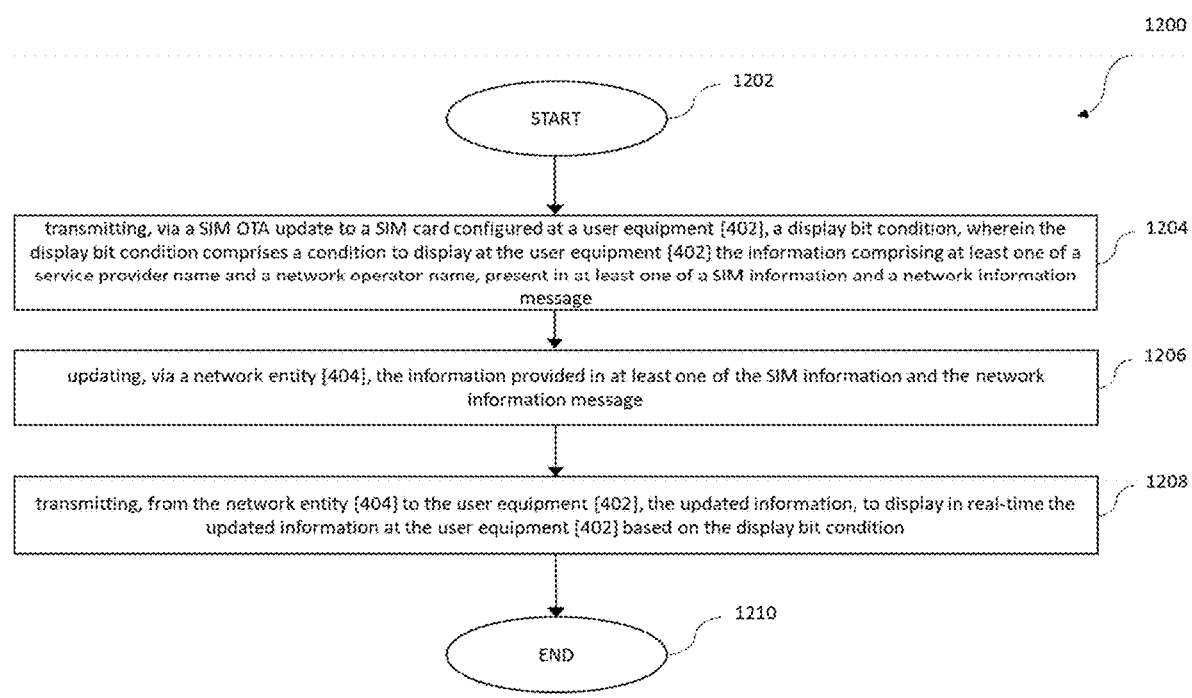
FIG. 12 illustrates an exemplary method flow diagram [1200], depicting a method of updating an information displayed at a user equipment, in accordance with exemplary embodiments of the present disclosure.

Referring to FIG. 12, an exemplary method flow diagram [1200], depicting a method of updating an information displayed at a user equipment [402], in accordance with exemplary embodiments of the present disclosure is shown. The information further comprises at least one of a service provider name and a network operator name. In an implementation the method [1200] is implemented at a network entity [404], wherein the network entity [404] is connected to the user equipment [402]. Also, the network entity [404] is one of a SIM OTA server unit and a core network unit. As shown in FIG. 12 the method [1200] begins at step [1202].

At step [1204], the method comprises transmitting, via a SIM OTA update to a SIM card configured at a user equipment [402], a display bit condition, wherein the display bit condition comprises a condition to display at the user equipment [402] the information present in at least one of a SIM information and a network information message. The information comprises at least one of the service provider name and the network operator name.

Further, in an implementation in a 4G Long-Term Evolution (LTE) network, the transmitting, via the SIM OTA update to the SIM card configured at the user equipment [402], the display bit condition further comprises transmitting, via the SIM OTA update the display bit condition in an EF_SPN file. Furthermore, the method in said implementation in the 4G Long-Term Evolution (LTE) network further encompasses transmitting, via the SIM OTA update the display bit condition/s for at least one of the EF_SPN file, an EF_SPNI file, an EF_SPDI file, an EF_PNN file, an EF_PNNI file and an EF_OPL file, wherein the display bit condition is transmitted for at least one of the EF_SPN file, the EF_SPNI file and the EF_SPDI file to control a display of the service provider name (SPN), and the display bit condition is transmitted for at least one of the EF_PNN file, the EF_PNNI file and the EF_OPL file to control a display of the network operator name.

Further, if in an implementation if the SIM card is not pre-configured with SIM files (for instance with the EF_SPN/EF_PNN files in the 4G LTE network) for display of service provider name or PLMN network name, an operating system (OS) of the user equipment [402] in such instance picks up the network operator name received in the network information message (for instance an EMM Information message in the 4G LTE network) to further display it on various screens of the user equipment [402] like a Home screen, a Lock screen, a Drag Screen, a Notification bar etc.

Next, at step [1206], the method comprises updating, via a network entity [404], the information provided in at least one of the SIM information and the network information message. The network entity [404] is one of the SIM OTA server unit and the core network unit. Further, the information provided in the SIM information is updated via the SIM OTA server unit and the information provided in the network information message is updated via the core network unit. Also, the updating, via a network entity [404], the information provided in the SIM information further comprises updating via the SIM OTA server unit an information present in at least one SIM file. For instance, in the 4G LTE network the method encompasses updating via the SIM OTA server unit an information present in at least one an EF_SPN file and an EF_PNN file. Furthermore, the updating, via a network entity [404], the information provided in the network information message further comprises updating via the core network unit a text string at least under a name of network operator. For instance, in the 4G LTE network the method encompasses updating via a mobility management entity (MME), a text string under at least one of a full name of network operator and a short name of network operator in an EMM information message (i.e. network information message).

Furthermore, the method encompasses updating via the network entity [404], the information (i.e. at least one of the service provider name and the network operator name) provided in at least one of the SIM information and the network information message to add value to service/network provider's services by updating at least one of the service provider name and the network operator name with an array of information texts/graphical images such as Seasonal Greetings, Promotions, Social messages, Vaccination drives, Health Alerts, Disaster warnings, Indication of new plans or services or products launched by the service/network operator etc.

Further, at step [1208], the method comprises transmitting, from the network entity [404] to the user equipment [402], the updated information, to display in real-time the updated information at the user equipment [402] based on the display bit condition. The updated information further comprises at least one of an updated SIM information and an updated network information message. Also, the updated SIM information further comprises at least one of an updated customizable text and an updated customizable graphical image.

Furthermore, the updated SIM information is transmitted via the SIM OTA server unit to the SIM card configured at the user equipment [402] based on one of an HTTP Push, an HTTP Pull and SIM Over-The-Air (OTA) SMS upgrade mechanism. The file updating is followed by a SIM refresh (proactive) command in the same HTTP session, so that all values of the SIM card are refreshed and synced with the user equipment [402]. For instance, in the 4G LTE network, the method encompasses transmitting via the SIM OTA server unit to the SIM card configured at the user equipment [402], the updated information present in at least one the EF_SPN file and the EF_PNN file based on one of the HTTP Push, the HTTP Pull and the SIM Over-The-Air (OTA) SMS upgrade mechanism.

Also, the updated network information message is transmitted via the core network unit to the user equipment [402] based on one of a Detach with Re-attach message and a tracking area update (TAU). The TAU procedure may be initiated when the user equipment [402] enters a new tracking area (TA) that is not in the list of Tracking Area Identities (TAIs) allocated by the core network unit at the time of the user equipment's attach, or when the TAU timer expires in case of a Periodic TAU. For instance, in the 4G LTE network, the method encompasses transmitting via the MME to the user equipment [402], the text string updated under at least one of the full name of the network operator and the short name of the network operator in the updated EMM information message based on one of a Detach with Re-attach message and a tracking area update (TAU).

Thereafter, once the updated information is transmitted at the user equipment [402], the method encompasses displaying the updated information on the user equipment [402]. The operating system of the user equipment [402] based on the display bit condition, displays the updated information on various screens of the user equipment [402] like on the Home screen, the Lock screen, the Drag Screen, the Notification bar etc. Also, based on the implementation of the features of the present disclosure the updated/modified information may be displayed over-the-air to all users or a set of users (region wise).

Thereafter, the method terminates at step [1210].

Figure 13:
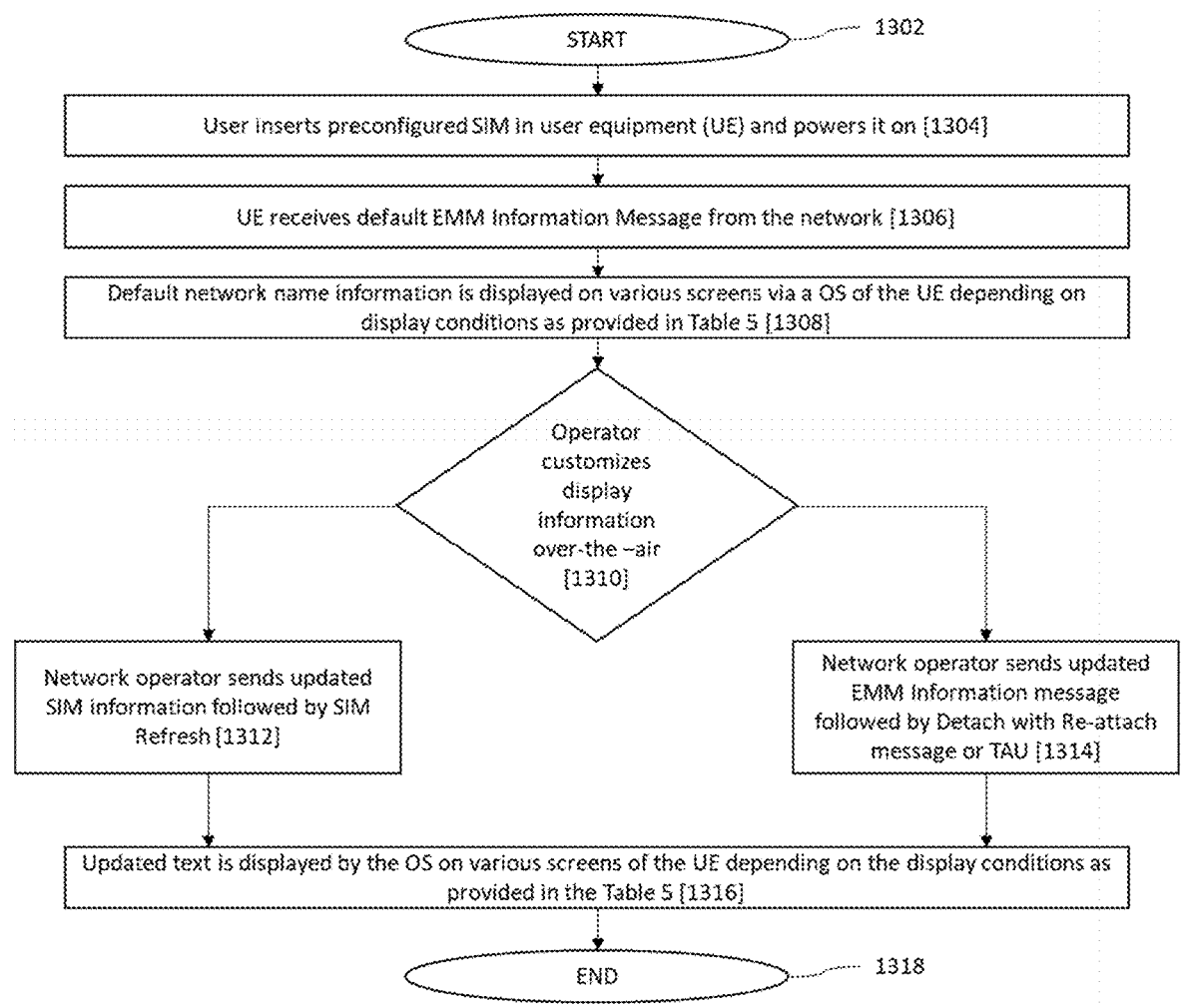
FIG. 13 illustrates an exemplary flow diagram, depicting an instance implementation of the process of updating an information displayed at a user equipment, in accordance with exemplary embodiments of the present disclosure.

Referring to FIG. 13, an exemplary flow diagram, depicting an instance implementation of the process of updating an information displayed at a user equipment, in accordance with exemplary embodiments of the present disclosure is shown. The information further comprises at least one of a service provider name and a network operator name. The FIG. 13 depicts the implementation of the features of the present invention in an exemplary 4G LTE network. As shown in FIG. 13, the exemplary process starts at step [1302].

At step [1304] the method depicts that a user of inserts preconfigured SIM in user equipment (UE) and powers it on. Furthermore, when the network operator SIM is inserted in the user equipment and powered, the user equipment (UE) attaches successfully with the network. Further, in an implementation, the network (via the core network unit/MME in 4G LTE network) is configured to send an EMM Information Message (i.e. the network information message) to the UE which contains a full and a short name for the network. The EMM Information Message can be sent anytime from the core network unit to the UE, as long as the UE is connected to the network.

Thereafter, at step [1306] the method depicts that the UE receives a default EMM Information Message from the network.

Next, the method at step [1308] indicates that a default network name information is displayed on various screens of the UE via an operating system (OS) of the UE depending on display conditions as provided in Table 5. More particularly, in an implementation where the network operator SIM card has been pre-configured with the EF_SPN and/or the EF_PNN files for display of the Service provider name or the PLMN network name, then the OS displays information based on the Table 5 as provided above. Also, in another implementation, if the SIM card is not pre-configured with the EF_SPN/EF_PNN files for display of Service provider name or PLMN network name, the OS picks up the network name received in the EMM Information message and display it on various screens of the user equipment like a Home screen, a Lock screen, a Drag Screen, a Notification bar etc.

Next, the method at step [1310] indicates that the network operator customizes over-the-air the display information provided on the display screen of the user equipment, as the network operator now can modify and update the information such as the network or service provider name over-the-air to add value to their services by displaying real-time messages and updates on the display screen of the user equipment.

Furthermore, the network operator via the network entity updates the information (i.e. at least one of the service provider name and the network operator name) in either of the below provided two ways:
i.) The Network Operator updates text/graphics values of the information present in the EF_SPN/EF_SPNI and/or the EF_PNN/EF_PNNI files through the SIM OTA server unit in the operator network.
ii.) The Network Operator updates the EMM Information message via the MME (i.e. core network unit) by modifying/updating text string in at least one of a Full and a Short name.

Next, at step [1312] the method depicts transmitting via the SIM OTA server unit to the SIM card of the user equipment, an updated SIM information in the event where the network operator updated the text/graphics values of the information present in the EF_SPN/EF_SPNI and/or the EF_PNN/EF_PNNI files through the SIM OTA server unit. Furthermore, the method at step [1312] depicts that the network operator sends/transmits the updated SIM information followed by SIM Refresh so that all values of the SIM card are refreshed and synced with the UE. More particularly, the updated SIM information is transmitted via the SIM OTA server unit to the SIM card based on one of an HTTP Push, an HTTP Pull and a SIM Over-The-Air (OTA) SMS upgrade mechanism.

Next, at step [1314] the method depicts transmitting via the core network unit to the user equipment, an updated network information message (i.e. a text string updated under the name of the network operator in the EMM Information message) followed by a Detach Request from the network with detach type—re-attach required or a TAU procedure. The TAU procedure may be initiated when the user equipment enters a new tracking area (TA) that is not in the list of Tracking Area Identities (TAIs) allocated by the core network unit at the time of the user equipment's attach, or when the TAU timer expires in case of a Periodic TAU.

Next, at step [1316] the method depicts that the updated information (i.e. at least one of the updated service provider name and the updated network operator name) is displayed by the OS of the user equipment on various screens of the UE depending on the display conditions as provided in the Table 5.

In an implementation, the information may be updated in non-peak hours without causing any downtime to on-going services in peak hours. Thereafter, in such implementation based on the SIM refresh and/or the Detach with Re-attach message or the TAU procedure, the updated information is further displayed by the OS of the UE on various screens of the UE based on the implementation of the features of the present invention.

Thereafter, the process terminates at step [1318].

Thus, the present invention provides a novel solution of updating over-the-air an information (i.e. at least one of a service provider name and a network operator name) displayed at a user equipment, to further display in real-time the updated information at the user equipment to add value to the services of network/service operators. The network operators based on the implementation of the features of the present invention are able to dynamically configure and customize values of the fields of the information over-the-air to further add value to their services by displaying real-time messages and update such as Seasonal Greetings, Promotions, Social messages, Vaccination drives, Health Alerts, Disaster warnings, Indication of new plans or services or products launched by the service/network operator etc.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as a limitation.

We claim:

1. A method of updating an information displayed at a user equipment, the method comprises:
    transmitting, via a network entity, a network information message to the user equipment;
    transmitting, by a SIM OTA server, via a SIM OTA update to a SIM card configured at the user equipment, a display bit condition, wherein the display bit condition comprises a condition to control display at the user equipment the information comprising at least one of a service provider name and a network operator name present in at least one of a SIM information at the SIM card and the network information message, wherein the display bit condition indicates a condition to display and to not display the service provider name and the network operator name each for a case of residing at a home network and for a case of residing at a roaming network;
    updating, via the network entity, the information provided in at least one of the SIM information and the network information message, wherein the updated network information message is transmitted by the network entity to the user equipment based on a tracking area update (TAU); and
    transmitting, from the network entity to the user equipment, the updated information, to display in real-time the updated information at the user equipment based on the display bit condition.

2. The method as claimed in claim 1, wherein the information provided in the SIM information is updated via a SIM OTA server unit and the information provided in the network information message is updated via a core network unit.

3. The method as claimed in claim 2, wherein the updating, via a network entity, the information provided in the SIM information further comprises updating via the SIM OTA server unit an information present in at least one SIM file.

4. The method as claimed in claim 2, wherein the updating, via a network entity, the information provided in the network information message further comprises updating via the core network unit a text string at least under a name of network operator.

5. The method as claimed in claim 2, wherein the updated information further comprises at least one of an updated SIM information comprising at least one of an updated customizable text and an updated customizable graphical image and an updated network information message, wherein:
    the updated SIM information is further transmitted via the SIM OTA server unit to the SIM card configured at the user equipment based on one of an HTTP Push, an HTTP Pull and a SIM Over-The-Air (OTA) SMS upgrade mechanism.

6. A system of updating an information displayed at a user equipment, the system comprises:
    a transceiver unit configured to:
        transmit, via a network entity, a network information message to the user equipment; and
        transmit, by a SIM OTA server, a display bit condition via a SIM OTA update to a SIM card configured at the user equipment, wherein the display bit condition comprises a condition to control whether to display at the user equipment the information comprising at least one of a service provider name and a network operator name present in at least one of a SIM information at the SIM card and the network information message, wherein the display bit condition indicates a condition to display and to not display the service provider name and the network operator name each for a case of residing at a home network and for a case of residing at a roaming network; and
    a processing unit connected to the transceiver unit, the processing unit is configured to update via the network entity, the information provided in at least one of the SIM information and the network information message, wherein the updated network information message is transmitted by the network entity to the user equipment based on a tracking area update (TAU), wherein
    the transceiver unit is further configured to transmit, from the network entity to the user equipment, the updated information, to display in real-time the updated information at the user equipment based on the display bit condition.

7. The system as claimed in claim 6, wherein the processing unit is further configured to update:
    the information provided in the SIM information via a SIM OTA server unit, and
    the information provided in the network information message via a core network unit.

8. The system as claimed in claim 7, wherein the processing unit to update via the SIM OTA server unit, the information provided in the SIM information is further configured to update via the SIM OTA server unit an information present in at least one SIM file.

9. The system as claimed in claim 7, wherein the processing unit to update via the core network unit, the information provided in the network information message is further configured to update via the core network unit a text string at least under a name of network operator.

10. The system as claimed in claim 7, wherein the updated information further comprises at least one of an updated SIM information comprising at least one of an updated customizable text and an updated customizable graphical image and an updated network information message, wherein:

the transceiver unit is further configured to:
transmit via the SIM OTA server unit to the SIM card configured at the user equipment, the updated SIM information based on one of an HTTP Push, an HTTP Pull, and a SIM Over-The-Air (OTA) SMS upgrade mechanism.

11. One or more non-transitory computer-readable media comprising computer-executable instructions that, when executed by a computing system, perform a method of updating an information displayed at a user equipment, the method comprising:

transmitting, via a network entity, a network information message to the user equipment;

transmitting, by a SIM OTA server, via a SIM OTA update to a SIM card configured at the user equipment, a display bit condition, wherein the display bit condition comprises a condition to control display at the user equipment the information comprising a service provider name or a network operator name present in a SIM information at the SIM card or the network information message, wherein the display bit condition indicates a condition to display and to not display the service provider name and the network operator name each for a case of residing at a home network and for a case of residing at a roaming network;

updating, via the network entity, the information provided in the SIM information or the network information message, wherein the updated network information message is transmitted by the network entity to the user equipment based on a tracking area update (TAU); and transmitting, from the network entity to the user equipment, the updated information, to display in real-time the updated information in place of at least one of the service provider name and the network operator name at the user equipment based on the display bit condition.

12. The method of claim 1, wherein the user equipment is associated with two Access Point Names (APNs) comprising a primary APN for data and "IMS" APN for voice with one default bearer for each APN.

13. The method of claim 1, wherein the information provided in at least one of the SIM information and the network information message is updated in non-peak hours without causing anytime to on-going services in peak hours.

14. The method of claim 1, wherein the updated information is transmitted to display at the user equipment in place of the service provider name.

15. The method of claim 1, wherein the updated information is transmitted to display at the user equipment in place of the network operator name.

* * * * *